Oct. 3, 1950  E. PICK  2,524,635
APPARATUS FOR TREATING AQUEOUS
SOLUTIONS OF ELECTROLYTES
Filed June 7, 1947

INVENTOR.

Patented Oct. 3, 1950

2,524,635

UNITED STATES PATENT OFFICE 2,524,635

APPARATUS FOR TREATING AQUEOUS SOLUTIONS OF ELECTROLYTES

Eric Pick, East Rockaway, N. Y., assignor to The Permutit Company, New York, N. Y., a corporation of Delaware Application June 7, 1947, Serial No. 753,345

11 Claims. (Cl. 210—24)

This invention relates to apparatus for treating aqueous solutions of electrolytes by ion exchange materials, all as more fully described and as claimed hereinafter.

Ion exchange materials have come into wide use for the treatment of aqueous solutions of electrolytes. Such materials may be cation exchange materials, usually having sodium or hydrogen as the exchangeable cation. On passing an aqueous solution containing dissolved salts through cation exchange material, the metallic cations in the solution are exchanged for sodium or hydrogen, thus transforming the dissolved salts to sodium salts or mineral acids, respectively. When employing a cation exchanger charged with hydrogen ions, the acid effluent may subsequently be passed through an anion exchange bed, whereby the sulfates, chlorides, etc. are exchanged for hydroxyl ions so that the acidity of the solution is removed.

After such ion exchange materials have exchanged substantially all the ions with which they had been originally charged, their capacity for further exchange becomes exhausted and they must be regenerated for further use. The regeneration in the case of cation exchangers consists of treating the bed with a solution of sodium chloride or a strong mineral acid, depending on whether it is used in the sodium cycle or the hydrogen cycle. The regeneration of the anion exchange material is carried out by treating the bed with a solution of an alkali such as sodium hydroxide, sodium carbonate, ammonium hydroxide, etc. It is customary to remove accumulated solid impurities from each bed just prior to regeneration by an upward flow of water, termed backwashing, which cleanses and regrades the bed of ion exchange material. After treatment with the regenerant, the bed of ion exchange material is rinsed free of spent and excess regenerant by a flow of water to waste, termed rinsing. Thereupon the bed is in condition to be returned to use and treat another quantity of aqueous solution.

It is an object of this invention to provide simple, effective and accurate means for measuring out a quantity of liquid regenerant to be used in each regeneration of the ion exchange material.

It is another object of this invention to provide for automatic control of said means.

The manner in which these objects are achieved is shown in the appended drawings in which—

Figure 1:
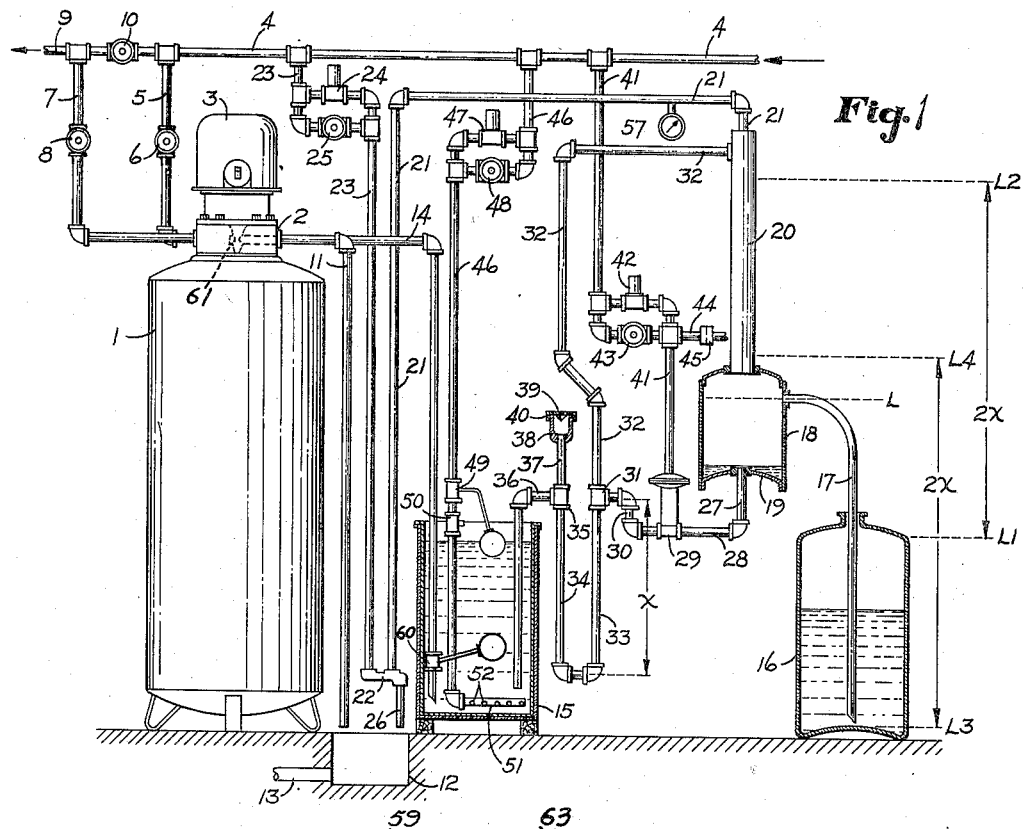
Fig. 1 is a more or less diagrammatic showing of an apparatus embodying my invention.

The apparatus will now be described with particular reference to the treatment of water by cation exchange material charged with hydrogen ions. The apparatus comprises a tank 1 containing a bed of cation exchange material (not shown). Mounted on tank 1 is a multiport valve 2 which is operated by an operating and control mechanism 3. Such apparatus is fully shown and described in my Patent No. 2,052,515 dated August 25, 1936. A supply pipe 4 for water to be treated is connected by an inlet pipe 5 having therein a valve 6 with the multiport valve 2, and the multiport valve is connected by an outlet pipe 7 having therein a valve 8 with the service pipe 9 leading to a point of use. A bypass valve 10 is provided which permits supplying untreated water from pipe 4 to pipe 9 by opening valve 10 and closing valves 6 and 8. Normally, however, valve 10 is closed and valves 6 and 8 are open. A waste pipe 11 leads from the multiport valve 2 to a sump 12 which discharges through a drain 13 to a point of disposal for waste liquids. A regenerant pipe 14 is adapted to be placed in communication with an injector 61 within multiport valve 2 by operation of the mechanism 3 whereby a suction is created in the pipe 14 which leads from the multiport valve 2 to a receiving tank 15 which advantageously is lead-lined, as shown, in order to resist the corrosive action of the dilute mineral acid used in regenerating the cation exchange material.

A supply of concentrated mineral acid, preferably sulfuric acid, is provided in a container 16 which may be a carboy, as shown, a drum or any other suitable storage tank. A tube 17 leads from the container 16 to a measuring tank 18 which has an inverted bottom 19. Attached to the top of the measuring tank 18 and thus forming a part thereof, is a riser 20 having a cross-sectional area large relative to the size of piping used, and preferably, but not necessarily small relative to the cross-sectional area of tank 18. The top of riser 20 is connected to a suction pipe 21 of an ejector 22 which is supplied with water through a pipe 23 connected to the supply pipe 4. A normally closed solenoid valve 24 and a manual valve 25 are arranged in parallel to control the flow of water through pipe 23. An ejector outlet pipe 26 is adapted to discharge into the sump 12.

A pipe 27 leads through the bottom 19 of the measuring tank 18 to a horizontal pipe 28 provided with a normally open diaphragm valve 29. The pipe 28 is connected by a short length of vertical pipe 30 with a T 31, which in turn, is connected by a pipe 32 with a point in the riser 20 near its upper end. The pipes 27, 28 and 30 form a U-shape, with the valve 29 located at the bottom of the U. Once the apparatus has been placed in operation, this U, including valve 29, is always filled with acid so that steel can be used without danger of corrosion, which would result on alternate contact with acid and with air. The T 31 is connected to a T 35 by a U-seal comprising legs 33 and 34. From the T 35 a discharge pipe 36 leads into the receiving tank 15 and a vent pipe 37 leads for a short distance upwardly to a fitting 38 provided with a notch 39 and a loosely fitted cap 40. It is advantageous, though not necessary, to extend this vent up to the level L so that there is no possibility for acid from tank 18 to overflow through the vent in case the discharge pipe 36 becomes obstructed. A pipe 41, provided in parallel with a normally closed solenoid valve 42 and a manual valve 43, leads from the supply pipe 4 to the diaphragm valve 29 and is provided, as shown, with a pipe 44 leading through a small orifice 45 to a suitable place of disposal.

A pipe 46 is adapted to supply dilution water from the supply pipe 4 to the receiving tank 15. It is provided with a normally open solenoid valve 47 and a manual valve 48, arranged in parallel to each other, a float valve 49 adapted to close when the level in receiving tank 15 has reached a predetermined height, and an aspirator or injector 50. The end of pipe 46 has a horizontal arm 51 provided with orifices 52 therein.

Figure 2:
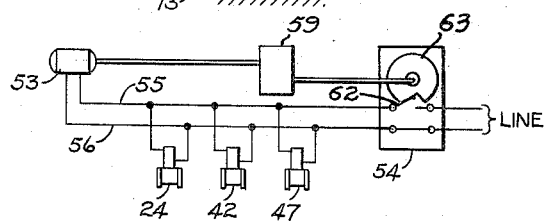
Fig. 2 is a simplified wiring diagram for the apparatus of Fig. 1.

The wiring diagram of Fig. 2 is based on Fig. 14 of my aforesaid Patent No. 2,052,515. A motor 53 (identified by the numeral 74 in said Fig. 14) for operating and timing the multiport valve 2, is arranged in a circuit parallel with solenoid valves 24, 42 and 47 by wires 55 and 56. The supply of current through wires 55 and 56 is controlled by a mechanism 54 including a switch 62 actuated by a cam 63 which is rotated by the motor 53 through a gear reduction 59 as shown in greater detail in Fig. 14 of my aforesaid patent.

In normal operation of the apparatus shown in Fig. 1, water flows through pipes 4 and 5 to the multiport valve 2, thence through the cation exchange material in tank 1 and back through multiport valve 2 and pipes 7 and 9 to a point of use. When regeneration of the cation exchange material is required, the motor 53 is energized by manually closing switch 62 and holding it until the motor 53 has advanced the cam 63 sufficiently far to close switch 62. The motor 53 then continues to operate throughout the cycle of regenerating operations, timing them by its operation. As shown in Fig. 2, energization of motor 53 also energizes solenoid valves 24, 42 and 47, opening valves 24 and 42 and closing valve 47. The opening of valve 42 supplies pressure water to the diaphragm valve 29, closing it, and a small stream of water continues to flow to waste through the pipe 44 and the orifice 45. It should be noted that valves 25, 43 and 48 are normally closed and serve only for the purpose of enabling the operator to operate the equipment under manual control.

The operation of motor 53 causes the multiport valve 2 to move slowly, providing the cycle of regenerating operations comprising first a backwashing, then an introduction of regenerant, then rinsing and finally restoration of the apparatus to normal operation, all as fully described in said Patent No. 2,052,515. Before the apparatus is initially placed in operation, the cover 40 is removed from the fitting 38 and a quantity of concentrated acid is poured in, sufficient to fill legs 33 and 34 with acid.

The opening of valve 24 supplies water to the ejector 22, thus creating a suction which is transmitted through pipe 21 and riser 20 to the measuring tank 18, thereby causing concentrated sulfuric acid or other suitable regenerant to flow from the container 16 through the tube 17 into the measuring tank 18. The suction produced by the ejector 22 causes the acid in the U-seal 33, 34 to drop in the leg 34 and to rise into the pipe 32. The vacuum remains substantially constant at a value which corresponds to the difference in height between the actual level in tank 16 and the level L plus the friction loss in tube 17, once the acid begins to flow from tank 16 into measuring tank 18, up to the time when the acid in tank 18 reaches the level L. Thereupon, the vacuum increases gradually as the concentrated acid rises above level L into the riser 20. During this increase in vacuum, the level in leg 34 continues to drop and as soon as it has reached the bottom of the U-seal 33, 34, all the acid contained in this seal will be sucked through the pipe 32 into the riser 20 thereby breaking the vacuum and venting the system from notch 39 through pipe 37, legs 33 and 34, pipe 32 into riser 20 and pipe 21, leading to the ejector 22. This breaking of the vacuum will cause the concentrated acid in the riser 20 and the upper portion of the measuring tank 18 to drain back through tube 17 into the container 16 until it has dropped to the level L.

In the course of the operation of valve 2, it reaches a position where the injector 61 built into it creates suction in pipe 14 thus drawing the previously prepared dilute acid solution from receiving tank 15 and passing it through the cation exchange material in tank 1. In spite of the drop of the level in receiving tank 15 during this operation, no water is admitted through pipe 46 because the valve 47 is closed.

As soon as the valve 2 has completed the cycle of regenerating operations, the cam 63 opens switch 62 so that motor 53 and with it solenoid valves 24, 42 and 47 are de-energized, causing valves 24 and 42 to close and valve 47 to open. On closing of the valve 42, the pressure on the diaphragm valve 29 is dissipated through pipe 44 and orifice 45 so that the valve 29 opens. Thereupon the concentrated acid in measuring tank 18 flows through pipes 27, 28, 30, 33, 34 and 36 into the receiving tank 15. This flow continues until the level has drained down to the outlet pipe 27. When the flow of acid stops there is a small quantity of acid left on the inverted bottom 19 of measuring tank 18, as shown, which absorbs the moisture from the air in measuring tank 18 and thus prevents corrosion, and the U-seal 33, 34 has been refilled with concentrated acid. Simultaneously with the flow of acid from the measuring tank 18 into the receiving tank 15, there is a flow of water through pipe 46, open valve 47, and float valve 49 to the aspirator 50 which causes air to be drawn in and mixed with the water, and the mixture of air and water is discharged through the orifices 52 in the arm 51 into the receiving tank 15. The rising air bubbles cause an intimate mixing and uniform dilution of the incoming acid and water. As soon as sufficient water has been admitted to nearly fill the receiving tank 15, the float valve 49 closes and the receiving tank 15 now contains a quantity of dilute acid for use in the next regenerating cycle. This is the condition illustrated in Fig. 1.

There is no control over the quantity of dilute acid withdrawn from tank 15 other than the fact that suction is produced in pipe 14 for a predetermined interval of time. In any given installation with uniform water pressure, the quantity of dilute acid withdrawn will be uniform in succeeding cycles, and the arrangement is such that a small quantity of dilute acid is always left in the tank 15 so as to prevent drawing air into the tank 1. If desired, however, a float valve 60 may be provided to stop the flow into pipe 14 when a predetermined quantity of dilute acid has been withdrawn from tank 15. As an alternative to float valves for controlling the flow into and out of tank 15, electrodes may be provided which, through suitable electrical devices, control electrically operated valves used in place of float valves.

It will be noted that the level to which the acid rises in the riser 20 before the vacuum is broken depends upon the quantity of acid present in tank 16. The level will rise up to a point where the difference between the levels in tank 16 and in riser 20 equals $2x$ (less whatever small pressure loss may be created by the flow of acid through tube 17), $x$ being the height of the U-seal 33, 34. Thus, when the tank 16 is full, the acid will be drawn from level L1 to the level L2 before the vacuum is broken, whereas when the tank 16 is practically empty, the acid will be drawn from the level L3 to the level L4 before the vacuum is broken. It is important that the tube 17 be of large enough cross-sectional area relative to the capacity of the ejector 22 so that the flow of acid through tube 17 will not cause any substantial pressure loss, as such pressure loss would cause a premature drawing over of the acid in the U-seal 33, 34, thus causing insufficient acid to be drawn into measuring tank 18. As an alternative to making the tube 17 quite large, a flow restriction may be placed in the pipe 21.

The quantity of regenerant which is measured out in tank 18 is uniform regardless of the level in tank 16, provided, of course, that there is sufficient acid left in tank 16, since on completion of the acid draw and breaking of the vacuum, all excess acid above level L always drains back into the tank 16.

The quantity of acid flowing into the receiving tank is the volume in tank 18 between the level L and the level at which pipe 27 terminates, minus the relatively small and constant quantity of acid required to refill the U-seal 33, 34. The pipe 30 can, of course, be connected directly with pipe 36 so that the acid flowing from tank 18 into tank 15 does not pass through the U-seal 33, 34; in that event, the exact amount of acid in the measuring tank 18 between the level L and the level at which pipe 27 terminates is discharged into the receiving tank 15, but the U-seal must then be refilled with acid by a separate operation before another quantity of regenerant can be measured out.

While I have shown a fully automatic system for measuring out the regenerant, my invention may also be used to good advantage with manual control. In that case, the diaphragm valve 29 is replaced by a manually operated valve and the solenoid valves 24, 42 and 47 are omitted. In operation it is then merely necessary to have valves 29 and 48 normally open and valve 25 normally closed. During the time regenerant is withdrawn from receiving tank 15, valve 25 is opened and valves 29 and 48 are closed. The valves remain in such position at least for the period that regenerant is drawn from tank 15, but also at least up to the time when the vacuum is broken by the drawing over of the acid in U-seal 33, 34 into the riser 20. To observe when this occurs, it is advantageous to connect a vacuum gauge 57 to the vacuum system, for instance, to pipe 21, as shown. This vacuum gauge will indicate by a return of the pointer to near zero that the correct quantity of acid has been measured out. At any time thereafter, but prior to the next following regeneration, valve 25 is closed and valves 29 and 48 are opened.

I have shown my invention with particular reference to water treatment, but it is equally useful in treating other aqueous solutions of electrolytes, such as sugar-bearing solutions, etc. Reference has been made to my Patent No. 2,052,515 merely for the purpose of illustrating a suitable mechanism for automatically regenerating the ion exchange material, but my invention may, as well, be used in conjunction with other types of mechanism. Any suitable time switch may be used for energizing and de-energizing the solenoid valves 24, 42 and 47, and, if desired, a pump may be used in place of an injector to move the dilute regenerant solution from receiving tank 15 into tank 1. When regenerant solution of suitable concentration is available in tank 16, or when the desired dilution may be obtained by means of a water operated injector moving the regenerant solution from receiving tank 15 into tank 1, the dilution of the measured out regenerant in receiving tank 15 may be dispensed with.

Figure 3:
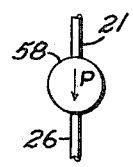
Fig. 3 is a modification of the apparatus shown in Fig. 1.

The ejector 22 may be supplied with compressed air instead of pressure water by connecting pipe 23 to a supply of air under pressure instead of to pipe 4, or replaced by any other suitable vacuum producing device, such as a vacuum pump 58, as shown in Fig. 3.

An arrangement in accordance with my invention has particular advantage in the handling and measuring out of concentrated sulfuric acid generally used for regenerating cation exchange material charged with hydrogen ions, but my system may, of course, be used, if desired, for handling and measuring concentrated or diluted liquid regenerant for any type of ion exchange material.

While I have shown and described what I consider the preferred embodiments of my invention, various changes may be made in the arrangement of parts and details of construction without departing from the spirit of my invention. Reference is, therefore, made to the appended claims for a definition of the scope of my invention.

What I claim is:

1. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, a tube connecting said storage tank with the next to the lowermost of said connections, vacuum-producing means in communication with the uppermost of said connections, a U-seal having two legs, one of said legs being vented and the other of said legs being connected with the next to the uppermost of said connections, a discharge pipe leading from the lowermost of said connections and being adapted to discharge into said receiving tank, a valve in said discharge pipe, a regenerant pipe leading from said receiving tank to said tank containing ion exchange material, and means for causing flow through said regenerant pipe.

2. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, vacuum-producing means in communication with the uppermost of said connections, a U-seal having two legs, one of said legs being vented and connected to said receiving tank and the other of said legs being connected by a lower pipe with the lowermost of said connections and by an upper pipe with the next to the uppermost of said connections, a valve in said lower pipe, and means for causing flow from said receiving tank to said ion exchange material.

3. The apparatus of claim 2, the upper portion of said measuring tank being of relatively small cross-sectional area as compared with the cross-sectional area of the lower portion of said measuring tank.

4. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, an ejector having a suction pipe in communication with the uppermost of said connections, a U-seal having two legs, one of said legs being vented and connected to said receiving tank and the other of said legs being connected by a lower pipe with the lowermost of said connections and by an upper pipe with the next to the uppermost of said connections, a valve in said lower pipe, a regenerant pipe leading from said receiving tank to said tank containing ion exchange material, means for causing flow through said regenerant pipe, a dilution water supply pipe leading to said receiving tank, and a valve in said dilution water pipe.

5. In the apparatus of claim 4, an aspirator in said dilution water pipe.

6. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, vacuum-producing means in communication with the uppermost of said connections, a U-seal having two legs, one of said legs being vented and connected to said receiving tank and the other of said legs being connected by a U-shaped lower pipe with the lowermost of said connections and by an upper pipe with the next to the uppermost of said connections, a valve in the lowermost portion of said U-shaped lower pipe, a regenerant pipe leading from said receiving tank to said tank containing ion exchange material, and means for causing flow through said regenerant pipe.

7. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, an ejector having a pressure fluid supply pipe with a valve therein and a suction pipe in communication with the uppermost of said connections, a U-seal having two legs, one of said legs being vented and connected to said receiving tank and the other of said legs being connected by a lower pipe with the lowermost of said connections and by an upper pipe with the next to the uppermost of said connections, a valve in said lower pipe, a regenerant pipe leading from said receiving tank to said tank containing ion exchange material, and means for causing flow through said regenerant pipe.

8. In the apparatus of claim 7, means for operating said valves, and timing means controlling said valve operating means to open said first named valve and close said second named valve for a predetermined interval of time and then close said first named valve and open said second named valve.

9. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, an ejector having a pressure fluid supply pipe with a valve therein and a suction pipe in communication with the uppermost of said connections, a U-seal having two legs, one of said legs being vented and connected to said receiving tank and the other of said legs being connected by a lower pipe with the lowermost of said connections and by an upper pipe with the next to the uppermost of said connections, a valve in said lower pipe, a regenerant pipe leading from said receiving tank to said tank containing ion exchange material, means for causing flow through said regenerant pipe, a dilution water supply pipe leading to said receiving tank, a valve in said dilution water supply pipe, means for operating said valves, timing means controlling said valve operating means to open said first named valve and close said two last named valves for a predetermined interval of time and then close said first named valve and open said two last named valves, and liquid level responsive means in said receiving tank for interrupting flow through said dilution water supply pipe when liquid in said receiving tank has risen to a predetermined level.

10. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, an ejector having a pressure fluid supply pipe with a normally closed solenoid valve therein and a suction pipe in communication with the uppermost of said connections, a U-seal having two legs, one of said legs being vented and connected to said receiving tank and the other of said legs being connected by a lower pipe with the lowermost of said connections and by an upper pipe with the next to the uppermost said connections, a normally open diaphragm valve in said lower pipe, a pressure fluid supply pipe for said diaphragm valve with a normally closed solenoid valve therein, a regenerant pipe leading from said receiving tank to said tank containing ion exchange material, means for causing flow through said regenerant pipe, a dilution water supply pipe leading to said receiving tank, a normally open solenoid valve in said dilution water supply pipe, time switch means, electric circuits including said solenoid valves and said time switch means whereby said time switch means is adapted to energize said solenoid valves for predetermined intervals of time, and liquid level responsive means in said receiving tank for interrupting flow through said dilution water supply pipe when liquid in said receiving tank has risen to a predetermined high level.

11. An apparatus for treating aqueous solutions of electrolytes comprising a tank containing a bed of ion exchange material, a storage tank for liquid regenerant, a receiving tank, a measuring tank located above said storage and receiving tanks and having connections at four different levels, the volume in said measuring tank between the lowermost and the next to the lowermost of said connections being slightly larger than the volume of liquid regenerant required for each regeneration of said ion exchange material, a tube connecting said storage tank with the next to the lowermost of said connections, vacuum-producing means in communication with the uppermost of said connections, a U-seal having two legs, one of said legs being vented and connected to said receiving tank and the other of said legs being connected with the next to the uppermost of said connections, a pipe connecting the lowermost of said connections with one of said legs, a valve in said last named pipe, a regenerant pipe leading from said receiving tank to said tank containing ion exchange material, and means for causing flow through said regenerant pipe.

ERIC PICK.

REFERENCES CITED

The following references are of record in the file of this patent:

UNITED STATES PATENTS

| Number | Name | Date |
|---|---|---|
| 1,255,358 | Uecke | Feb. 5, 1918 |
| 1,611,422 | Duden | Dec. 21, 1926 |
| 1,691,862 | Thomson et al. | Nov. 13, 1928 |
| 1,834,387 | Dotterweich | Dec. 1, 1931 |
| 2,052,515 | Pick | Aug. 25, 1936 |
| 2,065,962 | Bowers | Dec. 29, 1936 |
| 2,132,312 | Moore | Oct. 4, 1938 |
| 2,209,487 | Wagner | July 30, 1940 |